(12) United States Patent
Mohri et al.

(10) Patent No.: US 11,041,246 B2
(45) Date of Patent: Jun. 22, 2021

(54) METHOD OF OPERATING WATER ELECTROLYSIS SYSTEM AND WATER ELECTROLYSIS SYSTEM

(71) Applicant: HONDA MOTOR CO., LTD., Tokyo (JP)

(72) Inventors: Masahiro Mohri, Wako (JP); Yukihiro Fukushima, Wako (JP); Daisuke Misu, Wako (JP); Daisuke Kurashina, Wako (JP); Ryuki Goda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/419,050

(22) Filed: May 22, 2019

(65) Prior Publication Data

US 2019/0360110 A1    Nov. 28, 2019

(30) Foreign Application Priority Data

May 24, 2018    (JP) .............................. JP2018-099300

(51) Int. Cl.
  *C25B 1/04*    (2021.01)
  *C25B 15/02*    (2021.01)
  (Continued)

(52) U.S. Cl.
  CPC ................ *C25B 1/04* (2013.01); *C25B 15/02* (2013.01); *F25B 41/00* (2013.01); *F25B 47/006* (2013.01);
  (Continued)

(58) Field of Classification Search
  None
  See application file for complete search history.

(56) References Cited

U.S. PATENT DOCUMENTS

2001/0009223 A1*    7/2001   Lee ......................... C25B 15/00
                                                       204/269
2014/0096728 A1*    4/2014   Ortenheim ............. F02M 25/12
                                                       123/3

(Continued)

FOREIGN PATENT DOCUMENTS

JP    2010-086916    4/2010
JP    2015-048506    3/2015

OTHER PUBLICATIONS (Legible) machine translation of JP 2015-048506 of Nakazawa et al. (Year: 2015).*

(Continued)

*Primary Examiner* — Brian W Cohen
(74) *Attorney, Agent, or Firm* — Amin, Turocy & Watson, LLP

(57) ABSTRACT

A water electrolysis system includes a water electrolysis device; a water circulation circuit section including a water circulation pump; an antifreeze circulation circuit section including an antifreeze circulation pump; and a heat exchanger configured to perform heat exchange between the water circulation circuit section and the antifreeze circulation circuit section. Before water electrolysis is started by the water electrolysis device, a control device of the water electrolysis system circulates water by driving the water circulation pump and sets the antifreeze circulation pump to an operationally stopped state.

9 Claims, 7 Drawing Sheets

(51) Int. Cl.
*F25B 47/00* (2006.01)
*F25B 41/00* (2021.01)
*C25B 9/70* (2021.01)

(52) U.S. Cl.
CPC ............. *C25B 9/70* (2021.01); *F25B 2347/00* (2013.01); *F25B 2500/27* (2013.01); *F25B 2600/112* (2013.01); *F25B 2600/13* (2013.01); *F25B 2700/21* (2013.01)

(56) References Cited

U.S. PATENT DOCUMENTS

| | | | | |
|---|---|---|---|---|
| 2016/0090657 | A1* | 3/2016 | Nigel | .................. C25B 11/0452 |
| | | | | 205/638 |
| 2017/0327960 | A1* | 11/2017 | Kurashina | ............... C25B 15/02 |
| 2019/0010621 | A1* | 1/2019 | Bogers | ...................... C25B 1/04 |

OTHER PUBLICATIONS

Chinese Office Action and Search Report for Chinese Patent Application No. 201910428741.2 dated Feb. 25, 2021.

* cited by examiner

METHOD OF OPERATING WATER ELECTROLYSIS SYSTEM AND WATER ELECTROLYSIS SYSTEM

CROSS-REFERENCE TO RELATED APPLICATION

This application is based upon and claims the benefit of priority from Japanese Patent Application No. 2018-099300 filed on May 24, 2018, the contents of which are incorporated herein by reference.

BACKGROUND OF THE INVENTION

Field of the Invention

The present invention relates to a method of operating a water electrolysis system and a water electrolysis system for generating oxygen and hydrogen by electrolysis of water.

Description of the Related Art

Japanese Laid-Open Patent Publication No. 2015-048506 discloses a water electrolysis system including a water electrolysis device that generates oxygen and hydrogen by electrolysis of water. This type of water electrolysis system must suitably manage the exhaust heat (water temperature) of the water electrolysis device for the catalyst activation during the electrolysis performed by the water electrolysis device. Therefore, the water electrolysis system includes a water circulation circuit for circulating the water to and from the water electrolysis device, and also a water temperature adjustment device that cools the water supplied to the water electrolysis device.

The water temperature adjustment device desirably has a high cooling capability in order to effectively exhaust heat in the water electrolysis during summer, while also desirably having a structure to prevent freezing of the water when the surrounding temperature drops in winter. This is because, when the water freezes, abnormal heating of the water electrolysis device, breakdown of the ion exchange membrane, or the like occurs.

SUMMARY OF THE INVENTION

The present invention has been made in connection with the technology of the water electrolysis system described above, and it is an objective of the present invention to provide a method of operating a water electrolysis system and a water electrolysis system that can efficiently cool water supplied to a water electrolysis device and also effectively prevent freezing of the water.

In order to realize this objective, a method of operating a water electrolysis system and a water electrolysis system according to aspects of the present invention include a water electrolysis device; a water circulation circuit section including a water circulation pump and configured to circulate water to and from the water electrolysis device; an antifreeze circulation circuit section including an antifreeze circulation pump and configured to circulate antifreeze to and from a radiator; a heat exchanger configured to perform heat exchange between the water circulation circuit section and the antifreeze circulation circuit section; and a control device configured to control operations of the water circulation pump and the antifreeze circulation pump, wherein before water electrolysis is started by the water electrolysis device, the control device circulates the water by driving the water circulation pump and sets the antifreeze circulation pump to an operationally stopped state.

According to the present invention, the method of the water electrolysis system and the water electrolysis system can more appropriately adjust the water temperature of the water circulation circuit section by using the heat exchanger to perform heat exchange between the water circulation circuit section and the antifreeze circulation circuit section. In particular, when driving the water electrolysis system, before the water electrolysis is started, the water circulation pump is caused to operate and the antifreeze circulation pump is set to the operationally stopped state, and therefore water in which transfer of heat from the antifreeze circulation circuit section is suppressed is supplied from the water circulation circuit section to the water electrolysis device. For example, it is possible to prevent freezing of the water of the water circulation circuit section even when the antifreeze of the antifreeze circulation circuit section has a low temperature due to the surrounding temperature (outside atmosphere or the like) in winter, and therefore the water electrolysis by the water electrolysis device can be favorably implemented. Furthermore, the water electrolysis system can restrict the energy consumption by preventing needless driving of the antifreeze circulation pump before starting of water electrolysis.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
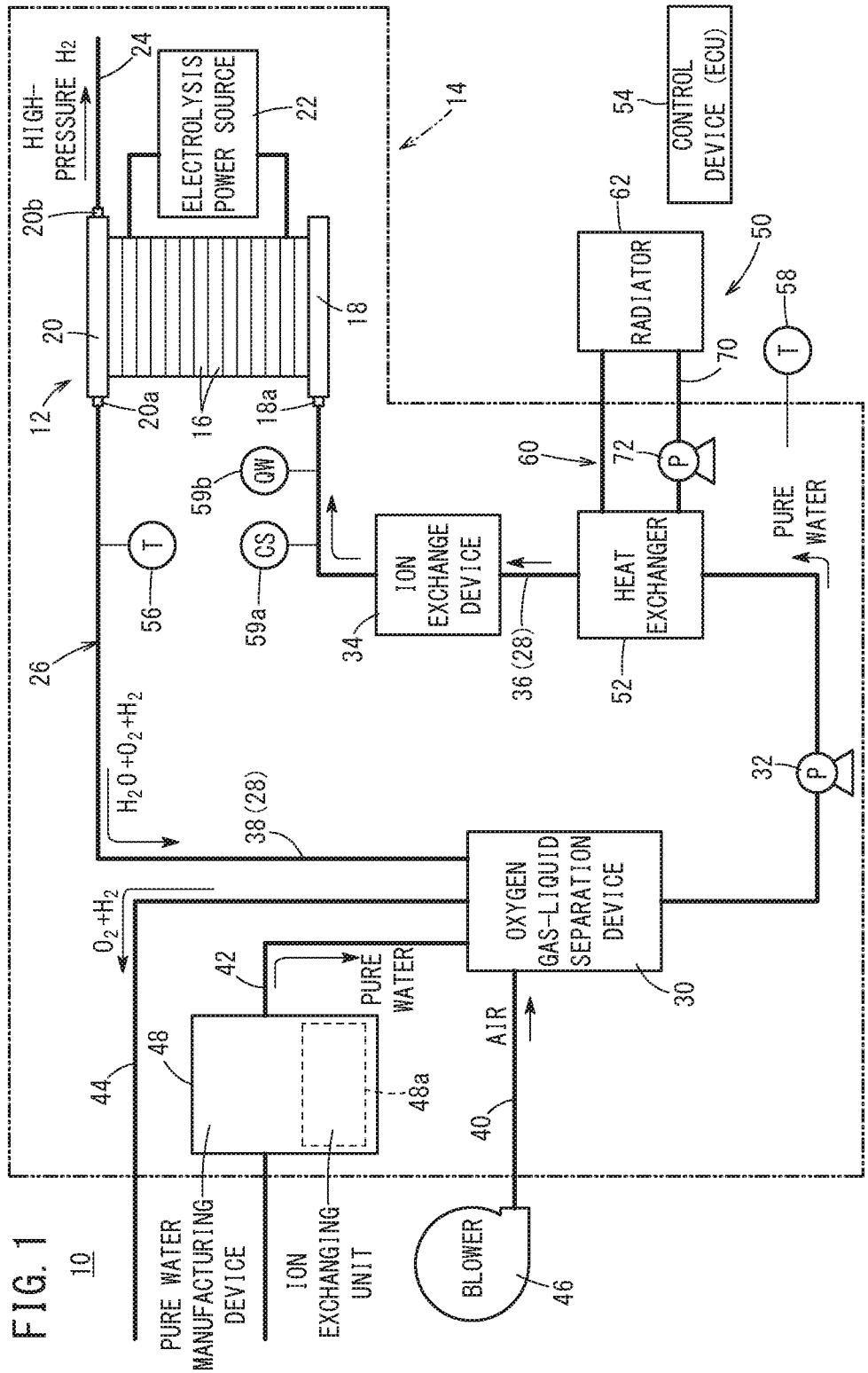
FIG. 1 is a block diagram of the overall configuration of a water electrolysis system according to an embodiment of the present invention.

The following describes examples of preferred embodiments of the present invention, while referencing the accompanying drawings.

A water electrolysis system 10 according to an embodiment of the present invention includes a water electrolysis device 12 (differential pressure water electrolysis device) that generates hydrogen and oxygen by electrolysis of water (pure water). Furthermore, most of the water electrolysis system 10 is housed in a production facility (referred to below as a housing 14), in order to prevent freezing of water supplied to the water electrolysis device 12.

The water electrolysis device 12 of the water electrolysis system 10 generates hydrogen (high-pressure hydrogen)

with a pressure, e.g., 1 MPa to 70 MPa, that is higher than the normal pressure of oxygen. The water electrolysis device 12 may also be configured to generate hydrogen at the normal pressure. For example, the water electrolysis device 12 is formed by stacking a plurality of water electrolysis cells 16, includes a first end plate 18 at one end in the stacking direction, and also includes a second end plate 20 at the other end in the stacking direction. An electrolysis power source 22, which is a DC (direct current) power source, is connected to the stacked body of the water electrolysis cells 16.

The first end plate 18 is provided with a water supply port 18a, and the second end plate 20 is provided with a water discharge port 20a and a hydrogen outlet port 20b. One end of a high-pressure hydrogen pipe 24 is connected to the hydrogen outlet port 20b. The water electrolysis device 12 outputs hydrogen to an adsorption device and a high-pressure hydrogen gas-liquid separation device (not shown in the drawings) that are connected to the other end of the high-pressure hydrogen pipe 24. The high-pressure hydrogen gas-liquid separation device separates water from hydrogen, and the adsorption device adsorbs water included in the hydrogen to generate commercial hydrogen (dry hydrogen). The generated hydrogen is stored in a hydrogen tank (not shown in the drawings).

A water circulation circuit section 26 that circulates water to and from the water electrolysis device 12 is connected to the water supply port 18a and the water discharge port 20a of the water electrolysis device 12. The water circulation circuit section 26 is provided with a water circulation pipe 28, an oxygen gas-liquid separation device 30, a water circulation pump 32, and an ion exchange device 34.

The water circulation pipe 28 includes a water supply pipe 36 that is connected to the water supply port 18a and a water discharge pipe 38 that is connected to the water discharge port 20a. The water supply pipe 36 is connected to the bottom portion of the oxygen gas-liquid separation device 30, and supplies water from the oxygen gas-liquid separation device 30 to the water electrolysis device 12. On the other hand, the water discharge pipe 38 is connected to the ceiling portion of the oxygen gas-liquid separation device 30, and supplies (discharges) the water used in the water electrolysis from the water electrolysis device 12 to the oxygen gas-liquid separation device 30.

The oxygen gas-liquid separation device 30 is installed on the water supply pipe 36, upstream from the water electrolysis device 12. The oxygen gas-liquid separation device 30 separates a gas (oxygen, hydrogen, or the like) from a liquid (water) discharged from the water electrolysis device 12. This oxygen gas-liquid separation device 30 is connected to an oxygen supply pipe 40, a pure water supply pipe 42, and an exhaust pipe 44, in addition to the water supply pipe 36 and the water discharge pipe 38. A blower 46 that supplies air to the oxygen gas-liquid separation device 30 is connected to the oxygen supply pipe 40.

A pure water manufacturing device 48 that supplies pure water to the oxygen gas-liquid separation device 30 is connected to the pure water supply pipe 42. The pure water manufacturing device 48 includes an ion exchanging unit 48a that has a cation exchange resin and an anion exchange resin, and removes chlorine and the like included in municipal water.

The exhaust pipe 44 discharges the gas (oxygen, hydrogen, and the like) separated from the water by the oxygen gas-liquid separation device 30, to the outside of the housing 14. The oxygen gas-liquid separation device 30 causes the water separated from the gas to flow out to the water supply pipe 36.

The water circulation pump 32 is installed on the water supply pipe 36, downstream from the oxygen gas-liquid separation device 30. The water circulation pump 32 is a centrifugal pump having fins (not shown in the drawing) whose rotational speed can be set, and applies a flow force corresponding to the rotational speed of the fins to the water. In other words, water whose flow rate has been suitably adjusted based on the rotational speed of the water circulation pump 32 is circulated through the water circulation pipe 28 of the water circulation circuit section 26.

A heat exchanger 52 that forms a portion of a water temperature adjustment device 50 is installed on the water supply pipe 36, downstream from the water circulation pump 32. The water temperature adjustment device 50 adjusts the temperature of the water (water temperature) of the water circulation circuit section 26 supplied to the water electrolysis device 12. This water temperature adjustment device 50 is configured to have a cooling capability to sufficiently lower the water temperature, which rises due to the water electrolysis performed by the water electrolysis device 12. Furthermore, the water temperature adjustment device 50 according to the present embodiment has a function to prevent freezing of the water when the water electrolysis system 10 is in standby, before the water electrolysis by the water electrolysis device 12 is started, and the like. The configuration of this water temperature adjustment device 50 is described in detail further below.

The ion exchange device 34 is installed on the water supply pipe 36, downstream from the heat exchanger 52. The ion exchange device 34 includes an ion exchanger such as an ion exchange resin therein, and removes impurities by causing an ion exchange effect with the ions contained in the water.

The water electrolysis system 10 further includes a control device 54 (ECU) that controls the operation of the entire system, a water temperature detector 56 that detects the water temperature of the water circulation circuit section 26 (the water inside the water circulation pipe 28), and a chamber temperature detector 58 that detects the chamber temperature inside the housing 14. As shown in FIG. 1, the water electrolysis system 10 may include a conductivity meter 59a that senses the conductivity of the water (or a hardness meter that detects hardness), a flow rate meter 59b that detects the water flow rate of the water circulation pipe 28, and the like on the water supply pipe 36 between the ion exchange device 34 and the water electrolysis device 12.

The control device 54 is configured as a computer (including a microcontroller) that has a processor, memory, and input/output interface (none of which are shown in the drawings). Specifically, the control device 54 performs control for operating the water electrolysis system 10 so as to suitably switch between a water electrolysis mode for performing water electrolysis, a standby mode for not performing water electrolysis, a startup mode prior to starting the water electrolysis, a stopped mode for stopping the water electrolysis, and the like.

In the water electrolysis mode, water is circulated to the water electrolysis device 12, water electrolysis is performed by the water electrolysis device 12, and the generated hydrogen is stored in the hydrogen tank. On the other hand, in the standby mode, the water electrolysis is stopped by stopping the supply of power from the electrolysis power source 22 to the water electrolysis device 12. Therefore, in the standby mode, the temperature of the water discharged from the water electrolysis device 12 (the exhaust heat of the water electrolysis device 12) is less than the water temperature in the water electrolysis mode.

As an example, the control device 54 determines that it is no longer necessary to generate hydrogen, due to enough hydrogen being stored in the hydrogen tank. Based on this determination, the operation mode is transitioned from the water electrolysis mode to the stopped mode, and after the stop mode, the standby mode is performed. Further, the control device 54 determines that there is a low amount of hydrogen stored in the hydrogen tank. Based on this determination, the operation mode is transitioned from the standby mode to the startup mode, and after the startup mode, the water electrolysis mode is performed.

When implementing each mode, the control device 54 controls the operation of the water temperature adjustment device 50 based on the water temperature of the water circulation circuit section 26 detected by the water temperature detector 56. The following is a detailed description of the water temperature adjustment device 50 of the water electrolysis system 10.

Figure 2:
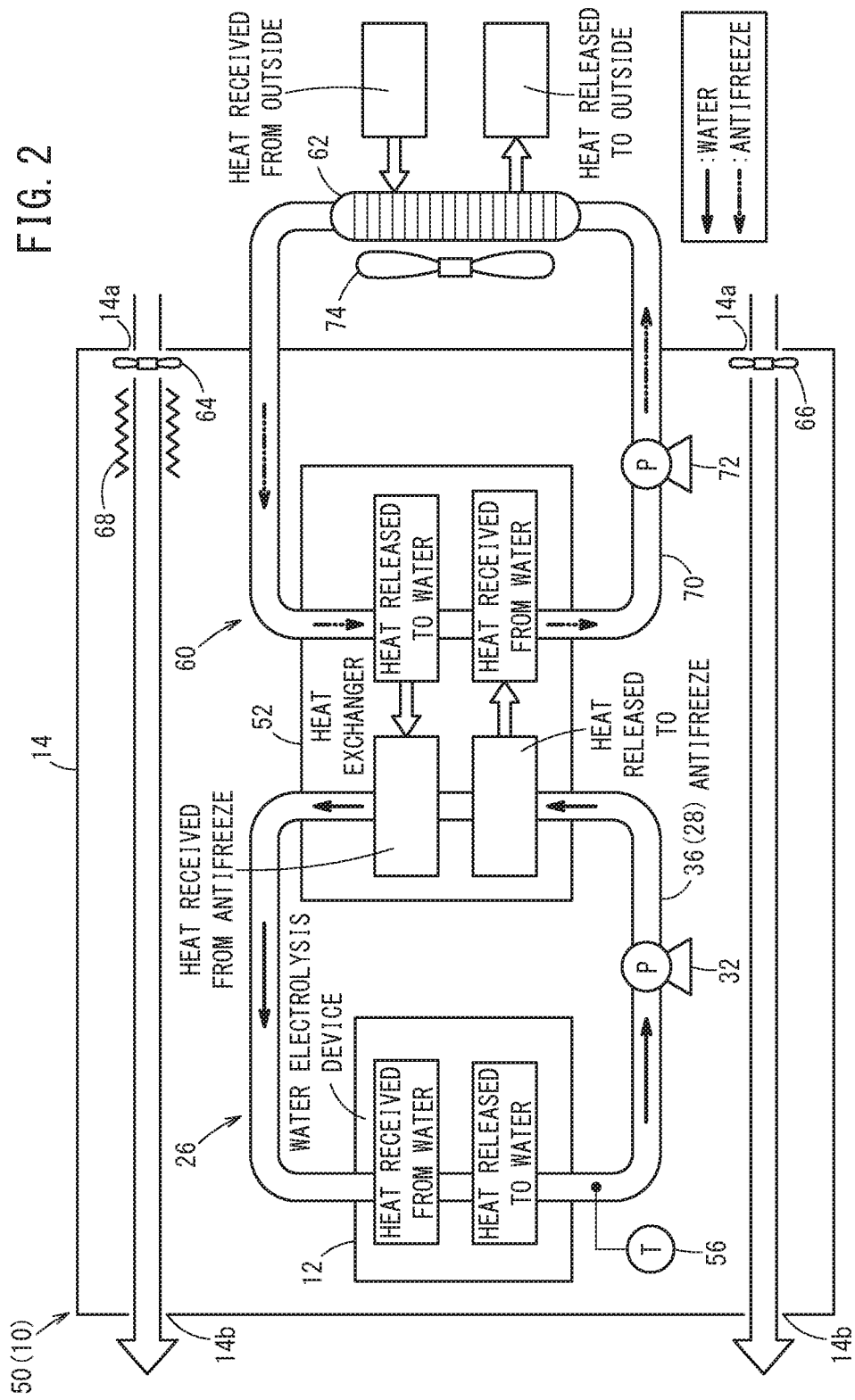
FIG. 2 is a descriptive diagram showing a function of a water temperature adjustment device of the water electrolysis system.

As shown in FIGS. 1 and 2, the water temperature adjustment device 50 is formed to include the heat exchanger 52 described above, a portion of the water circulation circuit section 26, and an antifreeze circulation circuit section 60 that circulates antifreeze to and from a radiator 62. The heat exchanger 52 performs heat exchange between the water circulation circuit section 26 and the antifreeze circulation circuit section 60. Furthermore, the water temperature adjustment device 50 includes an internal first fan 64, an internal second fan 66, and a heater 68 that perform ventilation inside the housing 14 and also adjust the temperature inside the housing 14.

The water circulation pipe 28 and the water circulation pump 32 described above are provided as the water circulation circuit section 26 forming the water temperature adjustment device 50. This is because it is possible to change the water temperature just by causing the water to flow inside the water circulation pipe 28 by operating the water circulation pump 32. In other words, the water temperature adjustment device 50 is configured as a cooling system in which each of the water circulation circuit section 26 and the antifreeze circulation circuit section 60 is configured as a closed loop, and heat exchange is performed between the two closed loops of these two circuit sections.

The antifreeze circulation circuit section 60 of the water temperature adjustment device 50 includes an antifreeze circulation pipe 70, an antifreeze circulation pump 72, and the radiator 62 described above. The antifreeze circulation pipe 70 includes an antifreeze circulation path therein. The antifreeze filling the antifreeze circulation pipe 70 is not particularly limited, but on the assumption that the temperature outside the housing 14 can become −20° C., an ethylene glycol aqueous solution with a concentration of 50% or more should be used.

A portion of the antifreeze circulation pipe 70 is housed inside the housing 14, and another portion of the antifreeze circulation pipe 70 is exposed to the outside of the housing 14. The heat exchanger 52 and the antifreeze circulation pump 72 are provided to the portion of the antifreeze circulation pipe 70 inside the housing 14, and the radiator 62 is provided to the other portion of the antifreeze circulation pipe 70 outside the housing 14. Furthermore, the pipe length (distance along the surface) and the inner diameter (cross-sectional area) of the antifreeze circulation pipe 70 are suitably set such that the more antifreeze is present in the portion of the antifreeze circulation pipe 70 housed inside the housing 14 than in the other portion of the antifreeze circulation pipe 70 exposed outside the housing 14.

The antifreeze circulation pump 72 of the antifreeze circulation circuit section 60 can be configured in the same manner as the water circulation pump 32. The antifreeze circulation pump 72 is formed as a centrifugal pump including fins (not shown), for example, and the control device 54 controls the rotational speed of the pump to increase or decrease the flow rate of the antifreeze flowing through the antifreeze circulation pipe 70.

The radiator 62 of the antifreeze circulation circuit section 60 performs heat exchange of the antifreeze with the outside atmosphere outside of the housing 14. A radiator fan 74 is provided at a position near the radiator 62. The rotation of the radiator fan 74 is controlled by the control device 54, to change the flow rate of air toward the radiator 62 based on the change in the rotational speed of the radiator fan 74.

The heat exchanger 52 of the water temperature adjustment device 50 performs liquid-liquid heat exchange between the water and the antifreeze. As an example, the heat exchanger 52 includes a plurality of heat transfer plates (not shown in the drawings) that connect the water circulation pipe 28 with the antifreeze circulation pipe 70, and can adopt a configuration for transferring heat via the plurality of heat transfer plates. In this way, the water flowing through the water circulation pipe 28 releases heat to the antifreeze of the antifreeze circulation pipe 70, while also receiving heat from the antifreeze. In other words, the antifreeze of the antifreeze circulation pipe 70 releases heat to the water of the water circulation pipe 28 while also receiving heat from the water. It is obvious that the configuration of the heat exchanger 52 is not particularly limited.

As shown in FIG. 2, the internal first and second fans 64 and 66 of the water temperature adjustment device 50 are respectively provided near a plurality of suction ports 14a formed in the housing 14. Each fan 64 and 66 takes the outside atmosphere into the housing 14 by rotating, and also discharges gas from a plurality of exhaust ports 14b formed in the housing 14. The heater 68 is provided at a position near the internal first fan 64. This heater 68 can be an electric heater, and heats the inside of the housing 14 and the air sucked in by the internal first fan 64, by performing heating under the control of the control device 54.

Figure 3:
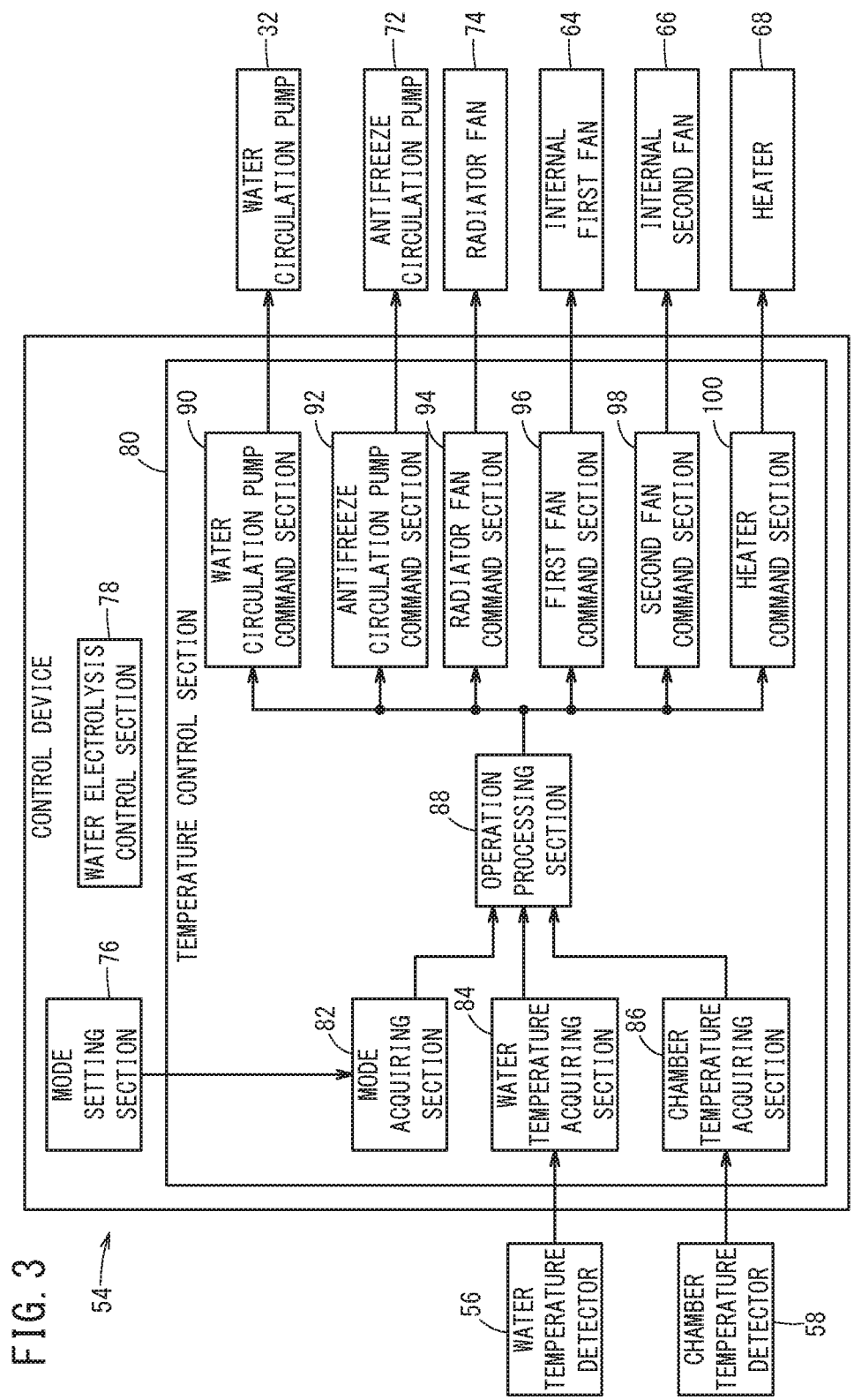
FIG. 3 is a block diagram showing a function of a control device during operation of the water electrolysis system.

The control device 54 controls the operation of the water electrolysis system 10 including the water temperature adjustment device 50 described above, by having a processor execute a program (not shown in the drawings) stored in the memory. Specifically, as shown in FIG. 3, function blocks such as a mode setting section 76, a water electrolysis control section 78, and a temperature control section 80 are constructed within the control device 54.

The mode setting section 76 sets the mode (standby mode, startup mode, water electrolysis mode, or stopped mode) of the water electrolysis system 10 described above. The mode setting section 76 calculates an amount of hydrogen based on the pressure value of a pressure sensor (not shown in the drawings) provided to the hydrogen tank, for example. The mode setting section 76 then switches to the standby mode or the water electrolysis mode according to the hydrogen amount, performs the startup mode when moving from the standby mode to the water electrolysis mode, and performs the stopped mode when moving from the water electrolysis mode to the standby mode.

The water electrolysis control section 78 performs water electrolysis by causing the water electrolysis device 12 to operate, based on the water electrolysis mode set by the mode setting section 76. In other words, the water electrolysis control section 78 causes a suitable power to be supplied to the water electrolysis device 12 from the electrolysis power source 22, thereby electrolyzing the water in the water electrolysis cells 16 to generate hydrogen and oxygen.

The temperature control section 80 controls the operation of the water temperature adjustment device 50 in conjunction with the mode setting section 76 and the water electrolysis control section 78. The temperature control section 80 is configured to include a mode acquiring section 82, a water temperature acquiring section 84, a chamber temperature acquiring section 86, an operation processing section 88, a water circulation pump command section 90, an antifreeze circulation pump command section 92, a radiator fan command section 94, a first fan command section 96, a second fan command section 98, and a heater command section 100 therein.

The mode acquiring section 82 acquires information concerning the mode set by the mode setting section 76, and provides this information to the operation processing section 88. The water temperature acquiring section 84 acquires information concerning the temperature of the water discharged from the water electrolysis device 12, as detected by the water temperature detector 56, and provides this information to the operation processing section 88. The chamber temperature acquiring section 86 acquires information concerning the chamber temperature of the housing 14, as detected by the chamber temperature detector 58, and provides this information to the operation processing section 88.

The operation processing section 88 sets the operational content of the water circulation pump 32, the antifreeze circulation pump 72, the radiator fan 74, the internal first fan 64, the internal second fan 66, and the heater 68 based on the information concerning the mode, water temperature, and chamber temperature provided by the respective acquiring sections, and transmits the set operational content to the respective command sections.

The water circulation pump command section 90 outputs a water circulation pump command to a water circulation pump driver (not shown in the drawings) that drives the water circulation pump 32, based on the operational content of the operation processing section 88. As an example, the water circulation pump command includes a rotational speed command value indicating the rotational speed of the fan of the water circulation pump 32, or a water circulation pump duty command value indicating a supplied power pulse width of the water circulation pump 32. In this way, the water circulation pump 32 rotates with a rotational speed corresponding to the water circulation pump command.

The antifreeze circulation pump command section 92 outputs an antifreeze circulation pump command to an antifreeze circulation pump driver (not shown in the drawings) that drives the antifreeze circulation pump 72, based on the operational content of the operation processing section 88. For example, the antifreeze circulation pump command includes a rotational speed command value indicating the rotational speed of the fan of the antifreeze circulation pump 72 or an antifreeze circulation pump duty command value indicating the supplied power pulse width of the antifreeze circulation pump 72. In this way, the antifreeze circulation pump 72 rotates at a rotational speed corresponding to the antifreeze circulation pump command.

The radiator fan command section 94 outputs a radiator fan command to a radiator fan driver (not shown in the drawings) that drives the radiator fan 74, based on the operational content of the operation processing section 88. For example, the radiator fan command includes a rotational speed command value indicating the rotational speed of the radiator fan 74 or a radiator fan duty command value indicating the supplied power pulse width of the radiator fan 74. In this way, the radiator fan 74 rotates with a rotational speed corresponding to the radiator fan command.

Similarly, the first fan command section 96 causes the internal first fan 64 to rotate based on the operational content of the operation processing section 88. The second fan command section 98 causes the internal second fan 66 to rotate based on the operational content of the operation processing section 88. Furthermore, the heater command section 100 causes the heater 68 to generate heat based on the operational content of the operation processing section 88.

Each command section described above may be configured to perform feedback control with the device that is the command target. Furthermore, by including each driver along with the command sections described above therein, the control device 54 may be configured to supply power to the water circulation pump 32, the antifreeze circulation pump 72, the internal first fan 64, the internal second fan 66, the heater 68, and the radiator fan 74 to thereby perform driving control thereof. For example, the circulation flow rate of the water due to the water circulation pump 32 may be controlled by calculating the rotational speed command value of the water circulation pump 32 from the difference between the flow rate detected by the flow rate meter 59b provided upstream from the water circulation circuit section 26 that supplies the water to the water electrolysis device 12 and a target flow rate.

Figure 4:
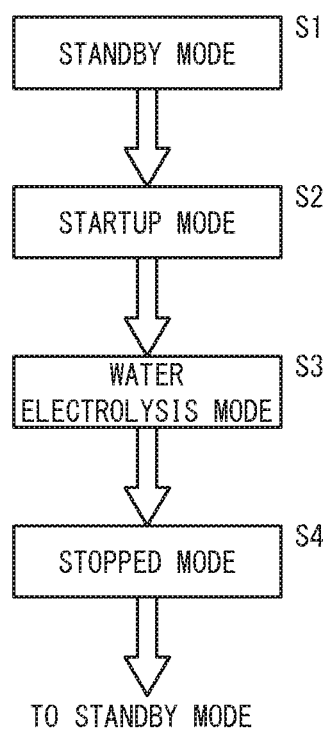
FIG. 4 is a flow chart showing the order of the modes of operation of the water electrolysis system.

The water electrolysis system 10 according to the present embodiment is basically configured in the manner described above, and the following is a description of the method of operating the water electrolysis system 10. As shown in FIG. 4, the following describes the operational content applied in the order of the standby mode (step S1), the startup mode (step S2), the water electrolysis mode (step S3), and the stopped mode (step S4).

Figure 5:
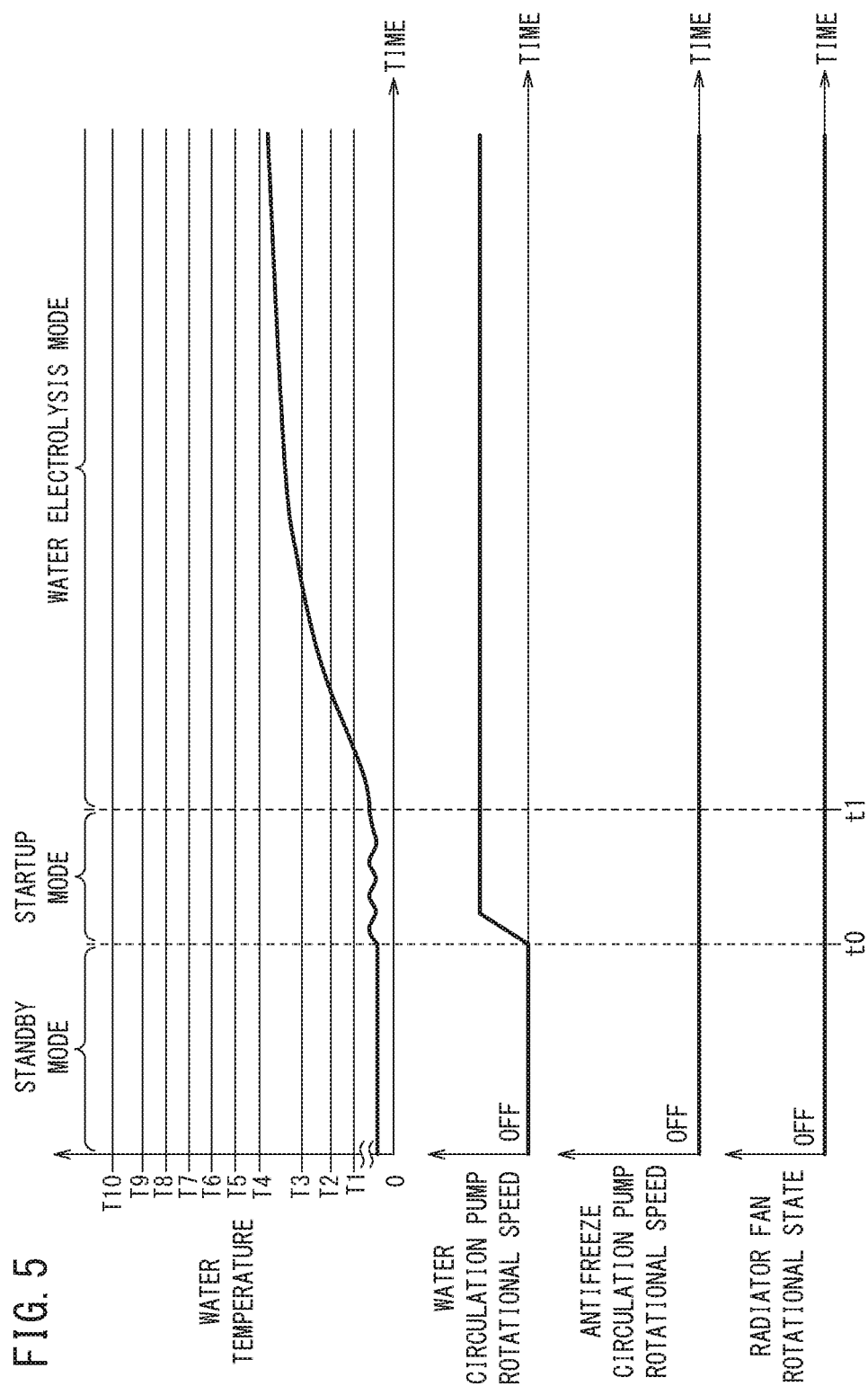
FIG. 5 is a time chart of a transition from a standby mode to a water electrolysis mode of the water electrolysis system.

When the amount of hydrogen in the hydrogen tank is greater than or equal to a prescribed amount, the control device 54 of the water electrolysis system 10 causes the mode setting section 76 to set the standby mode in which generation of hydrogen is stopped. In accordance with the standby mode, the water electrolysis control section 78 cuts off the supply of power from the electrolysis power source 22 to the water electrolysis device 12 to thereby stop the water electrolysis. Furthermore, upon acquiring the standby mode information from the mode setting section 76, the temperature control section 80 sets the water circulation pump 32 and the antifreeze circulation pump 72 to an operationally stopped state, as shown in FIG. 5. In this way, in the standby mode, the water of the water circulation circuit section 26 forming the closed loop is no longer circulated, and the antifreeze of the antifreeze circulation circuit section 60 forming the other closed loop is also no longer circulated.

In the standby mode, heat is prevented from being transferred from the atmosphere outside the housing 14 to the water circulation circuit section 26 and there is also no exhaust heat from the water electrolysis device 12. Therefore, the temperature of the water in the water circulation circuit section 26 is affected by the chamber temperature inside the housing 14. In other words, the water temperature changes gradually according to the chamber temperature.

The control device 54 according to the present embodiment performs control to keep the atmospheric temperature inside the housing 14 at 1° C. or greater. Therefore, the temperature control section 80 acquires the chamber temperature information from the chamber temperature detector 58 via the chamber temperature acquiring section 86, and determines the operational content of the internal first fan 64, the internal second fan 66, and the heater 68 based on the chamber temperature using the operation processing section 88.

For example, when it is determined that the chamber temperature is less than or equal to a low temperature threshold value (1° C. or the like), the operation processing section 88 sets the operational content that causes the internal first fan 64 to rotate and also causes the heater 68 to generate heat such that hot air flows inside the housing 14 (to heat the inside of the housing 14). Alternatively, when the chamber temperature becomes greater than or equal to a prescribed high temperature threshold value, the operation processing section 88 causes at least one or both of the internal first fan 64 and the internal second fan 66 to rotate in a state that operation of the heater 68 is stopped, to thereby expel heat (ventilate or the like) from the inside of the housing 14. The operation processing section 88 may be configured to cause the internal first fan 64, the internal second fan 66, and the heater 68 to operate based on the water temperature detected by the water temperature detector 56, without depending on the chamber temperature detected by the chamber temperature detector 58.

The water electrolysis system 10 can prevent freezing of the water of the water circulation circuit section 26 by keeping the inside of the housing 14 at a temperature greater than or equal to 1° C. even in the standby mode, even when the outside atmosphere (surrounding temperature) is less than or equal to the freezing point of water, for example. The control device 54 may cause the internal first fan 64, the internal second fan 66, and the heater 68 to operate in order to keep the chamber temperature of the housing 14 at 1° C. or greater in other modes as well. Further, the control device 54 may be configured to, in the standby mode, stop the antifreeze circulation pump 72 and cause the water circulation pump 32 to operate (cause the water of the water circulation circuit section 26 to be circulated).

As shown in FIG. 5, when it is determined that the generation of hydrogen is to be started by the mode setting section 76 at time t0, the water electrolysis system 10 implements the startup mode as a preparation stage for water electrolysis. In the startup mode, the operation processing section 88 sets the operation of the water circulation pump 32. On the other hand, the operation processing section 88 performs a setting to maintain the operationally stopped state of the antifreeze circulation circuit section 60 (the antifreeze circulation pump 72 and the radiator fan 74). The water circulation pump command section 90 outputs the water circulation pump command causing the rotational speed of the water circulation pump 32 to gradually increase to a certain rotational speed (e.g., 5000 rpm), based on the operational setting of the operation processing section 88. In this way, in the startup mode, the water of the water circulation circuit section 26 is circulated with a rated flow rate (the circulation flow rate needed for the water electrolysis of the water electrolysis device 12).

The water of the water circulation circuit section 26 is heated by the water circulation pump 32 during circulation, but this water releases heat via the water circulation pipe 28 (or a device in contact with the water circulation pipe 28) due to the circulation of the water. Furthermore, the water temperature of the water circulation circuit section 26 is decreased as a result of supplying water from the pure water manufacturing device 48 via the oxygen gas-liquid separation device 30, according to the water amount of the water circulation circuit section 26. Accordingly, in the startup mode, low-temperature water is supplied to the water electrolysis device 12.

The mode setting section 76 of the control device 54 measures the implementation time (or water flow rate) during which the startup mode is implemented, and transitions from the startup mode to the water electrolysis mode at time t1 when a prescribed period of time has elapsed (or when the prescribed flow rate has been reached). When the mode is set to the water electrolysis mode, the water electrolysis control section 78 supplies power from the electrolysis power source 22 to the water electrolysis device 12. The water electrolysis device 12 generates hydrogen and oxygen by electrolysis of the water supplied into the plurality of water electrolysis cells 16, and heat of reaction occurring at this time is transferred (exhausted) to the water. Therefore, the water temperature detector 56 of the water discharge pipe 38 detects that the water temperature is gradually rising.

Here, the operation processing section 88 includes first to tenth temperature threshold values T1 to T10 that become higher in a stepped manner from a low temperature to a high temperature, as threshold values for setting the operating content of the antifreeze circulation circuit section 60 (the antifreeze circulation pump 72 and the radiator fan 74). The operation processing section 88 constantly compares the acquired water temperature to the first to tenth temperature threshold values T1 to T10, and keeps the antifreeze circulation pump 72 in the operationally stopped state until the water temperature rises to be greater than or equal to the fourth temperature threshold value T4, for example. In other words, in the initial stage of the water electrolysis mode, circulation of liquid is performed in only one of the closed loops (the water circulation circuit section 26) and water is supplied from the pure water manufacturing device 48 to the water circulation circuit section 26, thereby promoting the cooling of the water.

Figure 6:
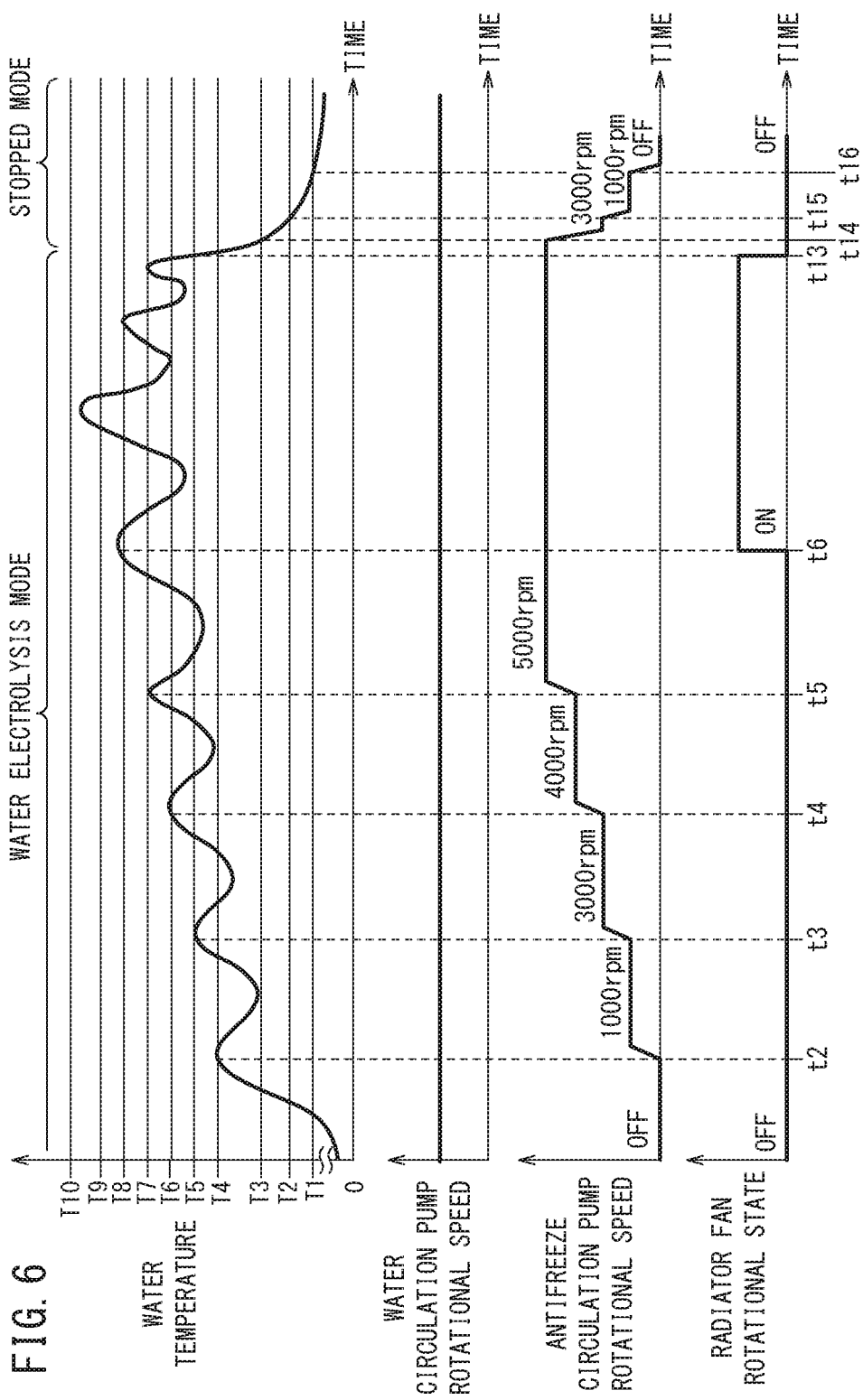
FIG. 6 is a time chart of the water electrolysis mode and a stopped mode of the water electrolysis system.

As shown in FIG. 6, when it is determined that the water temperature has become greater than or equal to the fourth temperature threshold value T4 at time t2, the operation processing section 88 starts the operation of the antifreeze circulation pump 72. In other words, the fourth temperature threshold value T4 is a pump operation start threshold value for changing the antifreeze circulation pump 72 from the stopped state to the operational state. At time t2, the radiator fan 74 is still in the operationally stopped state.

When the operation of the antifreeze circulation pump 72 starts, the operation processing section 88 performs control to change, in a stepped manner, the rotational speed of the antifreeze circulation pump 72, according to the water temperature. Specifically, when the water temperature becomes greater than or equal to the fourth temperature threshold value T4, the antifreeze circulation pump command section 92 is caused to output a first-stage pump command to the antifreeze circulation pump driver as the antifreeze circulation pump command. In the present embodiment, the first-stage pump command is an antifreeze circulation pump duty command value causing the antifreeze circulation pump 72 to rotate at a first rotational speed (1000 rpm or the like). In this way, the antifreeze circulation pump 72 provides the antifreeze with a flow force corresponding to the first rotational speed, to thereby cause the antifreeze to flow.

When the antifreeze circulates inside the antifreeze circulation circuit section 60, heat is released from the antifreeze to the outside atmosphere outside the housing 14

(including the radiator 62), and the temperature of the antifreeze drops. Furthermore, the heat exchanger 52 in the housing 14 performs heat exchange (releasing heat and receiving heat) between the antifreeze of the antifreeze circulation circuit section 60 and the water of the water circulation circuit section 26, thereby cooling the water. Even if the water temperature drops to be less than or equal to the fourth temperature threshold value T4 after the antifreeze circulation pump 72 has been caused to rotate, the operation processing section 88 keeps the antifreeze circulation pump 72 at the first rotational speed unless the water temperature is less than or equal to the third temperature threshold value T3.

Even when the temperature of the water of the water circulation circuit section 26 drops due to the heat exchange with the antifreeze, the water temperature rises again due to the exhaust heat caused by the water electrolysis if the water electrolysis capability of the water electrolysis device 12 is high. Therefore, when the water temperature becomes greater than or equal to the fifth temperature threshold value T5 at time t3, the operation processing section 88 causes the second-stage pump command (or antifreeze circulation pump duty command value) to be output from the antifreeze circulation pump command section 92. Due to this, the antifreeze circulation pump 72 rotates at the second rotational speed (3000 rpm or the like) to increase the flow rate of the antifreeze. In other words, the water temperature adjustment device 50 can increase the cooling capability of the water circulation circuit section 26 due to the antifreeze circulation circuit section 60.

In the same manner as described above, at time t4 when the water temperature has become greater than or equal to the sixth temperature threshold value T6, the operation processing section 88 causes the third-stage pump command to be output from the antifreeze circulation pump command section 92, thereby causing the antifreeze circulation pump 72 to rotate at a third rotational speed (4000 rpm or the like). Furthermore, at time t5 when the water temperature has become greater than or equal to the seventh temperature threshold value T7, the operation processing section 88 causes the fourth-stage pump command to be output, thereby causing the antifreeze circulation pump 72 to rotate at a fourth rotational speed (5000 rpm or the like). Accordingly, when the water electrolysis capability of the water electrolysis device 12 is sufficiently high, the antifreeze circulation pump 72 changes the flow rate of the antifreeze among four stages, and in accordance with this, the water temperature of the water circulation circuit section 26 gradually rises while repeatedly having the amplitude thereof raised and lowered.

Figure 7:
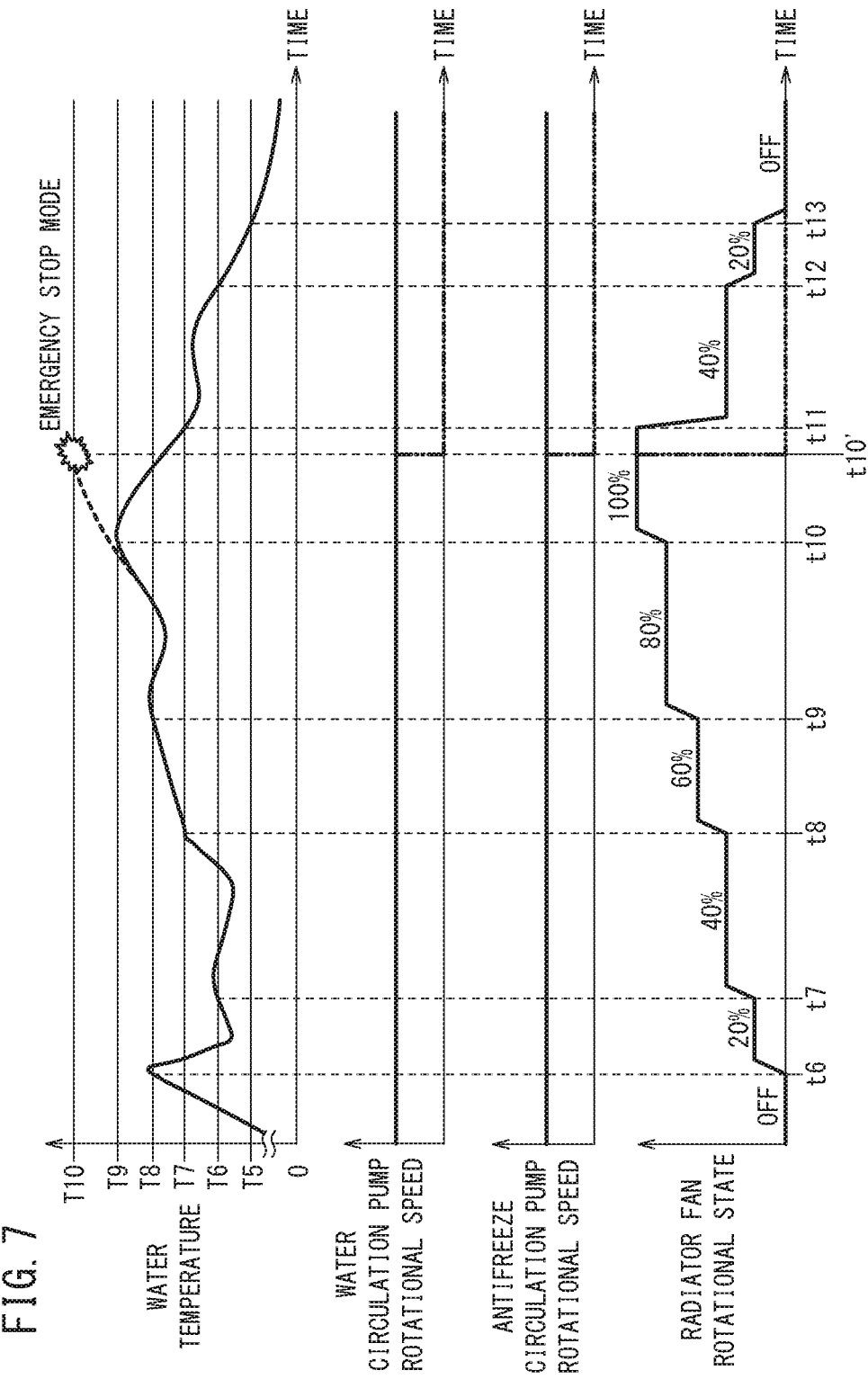
FIG. 7 is a time chart of rotation of a radiator fan during the water electrolysis mode of the water electrolysis system.

At time t6, when it has been determined that the water temperature has become greater than or equal to the eighth temperature threshold value T8, the operation processing section 88 starts the rotation of the radiator fan 74. Due to this, the water temperature adjustment device 50 performs air-cooling control to cause the radiator fan 74 to blow the outside air to the radiator 62 and cool the antifreeze inside the radiator 62. As shown in FIG. 7, the air-cooling control is also performed by the operation processing section 88 in a manner to change the rotational speed of the radiator fan 74 in a stepped manner, according to the water temperature.

Specifically, when the water temperature has become greater than or equal to the eighth temperature threshold value T8, the operation processing section 88 instructs the radiator fan command section 94 to start operating. The radiator fan command section 94 outputs a radiator fan duty command value of 20% to the radiator fan driver, as the first-stage radiator fan command. Due to this, the radiator fan driver supplies the radiator fan 74 with power having a 20% pulse width, and the radiator fan 74 rotates with a first rotational rate (rotational speed) corresponding to this pulse width and blows the outside air to the radiator 62. As a result, the antifreeze inside the radiator 62 is significantly cooled, and in the heat exchanger 52, this cooled antifreeze exchanges heat with the water, so that the water is further cooled than it was before the rotation of the radiator fan 74. For example, the water temperature in the water circulation circuit section 26 decreases to a temperature lower than the sixth temperature threshold value T6.

Therefore, after the first-stage radiator fan command has been output and the water temperature has become less than or equal to the sixth temperature threshold value T6, the operation processing section 88 determines that the water temperature has again become greater than or equal to the sixth temperature threshold value T6 (see time t7). Due to this, the operation processing section 88 causes the second-stage radiator fan command (40% duty command value) to be output from the radiator fan command section 94, and the radiator fan 74 rotates at a second rotational rate corresponding to a 40% pulse width. Alternatively, the operation processing section 88 may output the second-stage radiator fan command in a case where the water temperature remains greater than or equal to the sixth temperature threshold value T6 even after the radiator fan 74 has been rotating for a prescribed time.

Similarly, at time t8 when the water temperature has become greater than or equal to the seventh temperature threshold value T7, the operation processing section 88 causes third-stage radiator fan command (60% duty command value) to be output from the radiator fan command section 94, thereby causing the radiator fan 74 to rotate at a third rotational rate. Furthermore, at time t9 when the water temperature has become greater than or equal to the eighth temperature threshold value T8, the operation processing section 88 causes the radiator fan 74 to rotate at a fourth rotational rate according to a fourth-stage radiator fan command (80% duty command value), and at time t10 when the water temperature has become greater than or equal to the ninth temperature threshold value T9, the operation processing section 88 causes the radiator fan 74 to rotate at a fifth rotational rate according to a fifth-stage radiator fan command (100% duty command value).

At time t11 when the water temperature has become lower than a prescribed temperature threshold value (e.g., the seventh temperature threshold value T7) after the radiator fan 74 has rotated at the fifth rotational rate, the operation processing section 88 sets a prescribed duty command value (second-stage radiator fan command). Due to this, the radiator fan 74 lowers its speed from the fifth rotational rate to the second rotational rate. In other words, when the radiator fan 74 rotates at the fifth rotational rate, the cooling capability is maintained by maintaining the fifth rotational rate even when the water temperature drops by a certain amount (even when the water temperature becomes less than or equal to the eighth temperature threshold value T8).

At time t12 when the water temperature has further dropped to become less than the sixth temperature threshold value T6, the operation processing section 88 outputs the first-stage radiator fan command to cause the radiator fan 74 to rotate at the first rotational rate. At time t13 when the water temperature has become lower than the fifth temperature threshold value T5, the operation processing section 88 stops the radiator fan 74 (0% duty command value) to stop the air-cooling control.

The tenth temperature threshold value T10 among the plurality of temperature threshold values used for the determination by the operation processing section 88 is a value defining an upper limit value of the water temperature in the water circulation circuit section 26. In other words, at time t10' when the water temperature has increase to be greater than or equal to the tenth temperature threshold value T10 even after the radiator fan 74 has been made to rotate at the fifth rotational rate, the operation processing section 88 performs an emergency stop of the water electrolysis mode. This is because it is desirable to ensure the safety of the water electrolysis system 10 in a case where the water temperature is rising despite the radiator fan 74 rotating at the fifth rotational rate, where there are no other means for cooling the water of the water circulation circuit section 26. With this emergency stop control, the supply of power to the water electrolysis device 12 is stopped, and the rotation of the water circulation pump 32, the antifreeze circulation pump 72, and the radiator fan 74 are also stopped. Due to this, the water temperature of the water circulation circuit section 26 drops. The control device 54 may be configured to provide a user with notification of the emergency stop when the emergency stop is performed.

Returning to FIG. 6, after the rotational speed of the antifreeze circulation pump 72 has increased to the fourth rotational speed (5000 rpm), the operation processing section 88 performs control to keep the antifreeze circulation pump 72 at the fourth rotational speed until the water temperature becomes lower than the third temperature threshold value T3. When the water temperature has become lower than the third temperature threshold value T3 during the water electrolysis mode, the rotational speed of the antifreeze circulation pump 72 is lowered to a prescribed speed (e.g. the second rotational speed).

Then, when the hydrogen tank is sufficiently filled with hydrogen, for example, the water electrolysis system 10 (mode setting section 76) transitions from the water electrolysis mode to the stopped mode. In the stopped mode, the water electrolysis control section 78 stops the supply of power to the water electrolysis device 12. Therefore, the exhaust heat from the water electrolysis device 12 is eliminated, and the water temperature of the water circulation circuit section 26 drops.

At time t14 when the water temperature has become lower than the third temperature threshold value T3, the operation processing section 88 causes a prescribed antifreeze circulation pump duty command value (the second-stage pump command in the present embodiment: 3000 rpm or the like) to be output, to cause the antifreeze circulation pump 72 to rotate at the second rotational speed. Furthermore, at time t15 when the water temperature has become lower than the second temperature threshold value T2, the operation processing section 88 causes the antifreeze circulation pump 72 to rotate at the first rotational speed. At time t16 when the water temperature has become lower than the first temperature threshold value T1, the operation processing section 88 stops the rotation of the antifreeze circulation pump 72. In this way, the control device 54 can smoothly change the circulation state of the antifreeze in accordance with the water temperature drop of the water circulation circuit section 26. Furthermore, although not shown in the drawings, in the stopped mode, the operation processing section 88 may stop the operation of the water circulation pump 32 after a certain time has passed from when the antifreeze circulation pump 72 stopped (after the water temperature has dropped further or the like).

The water electrolysis system 10 and the method of operating the water electrolysis system 10 described above realize the following advantages.

The water electrolysis system 10 can more suitably adjust the water temperature of the water circulation circuit section 26 by using the heat exchanger 52 to perform heat exchange between the water circulation circuit section 26 and the antifreeze circulation circuit section 60. In particular, when operating the water electrolysis system 10, before the water electrolysis is started, the water circulation pump 32 is caused to operate and the antifreeze circulation pump 72 is set to the operationally stopped state. Therefore, in the water electrolysis device 12, the water in which heat transfer from the antifreeze circulation circuit section 60 is suppressed, is supplied from the water circulation circuit section 26, and then the preparation for the water electrolysis is completed. For example, the water electrolysis system 10 prevents freezing of the water of the water circulation circuit section 26 even when the antifreeze of the antifreeze circulation circuit section 60 has a low temperature due to the surrounding temperature (outside atmosphere or the like) in winter, and therefore the water electrolysis by the water electrolysis device 12 can be favorably implemented. Furthermore, the water electrolysis system 10 can restrict the energy consumption by preventing needless driving of the antifreeze circulation pump 72.

The antifreeze circulation circuit section 60 has the radiator 62 arranged outside of the housing 14. Accordingly, it is possible to effectively release heat from the antifreeze due to the atmosphere outside the housing 14. On the other hand, since the water electrolysis device 12 and the water circulation circuit section 26 are housed inside the housing 14, it is possible to gradually change the water temperature due to the chamber temperature inside the housing 14.

The heater 68 is provided inside the housing 14, and the control device 54 performs heating with the heater 68 when the chamber temperature of the housing 14 is low. Therefore, the chamber temperature of the housing 14 can be kept at a prescribed temperature, and even when the surrounding temperature of the housing 14 becomes less than or equal to the freezing point of water, for example, it is possible to prevent the freezing of the water of the water circulation circuit section 26.

After the water electrolysis by the water electrolysis device 12 has started, the control device 54 keeps the antifreeze circulation pump 72 in the operationally stopped state until the water temperature detected by the water temperature detector 56 becomes greater than or equal to the pump operation start threshold value (fourth temperature threshold value T4). Accordingly, it is possible to reliably prevent freezing of the water due to the heat exchange with the antifreeze.

When the water temperature is greater than or equal to the pump operation start threshold value (fourth temperature threshold value T4), the control device 54 controls the operation of the antifreeze circulation pump 72 to change the circulation rate of the antifreeze according to the water temperature. Therefore, it is possible to restrict the increase or the like of the water temperature of the water circulation circuit section 26 by more suitably controlling this water temperature.

When the water temperature has become lower than a pump operation stop threshold value (first temperature threshold value T1), which is lower than the pump operation start threshold value, after having become greater than or equal to the pump operation start threshold value (fourth temperature threshold value T4), the control device 54 stops the rotation of the antifreeze circulation pump 72. In this way, the water electrolysis system 10 can restrict the operation of repeatedly driving and stopping the antifreeze circulation pump 72.

When the water temperature becomes greater than or equal to a fan operation start threshold value (eighth temperature threshold value T8), which is higher than the pump operation start threshold value (fourth temperature threshold value T4), the control device 54 starts the rotation of the radiator fan 74. In this way, it is possible to increase the cooling capability of the antifreeze circulation circuit section 60, and to more favorably cool the water of the water circulation circuit section 26 that experiences heat exchange with the antifreeze circulation circuit section 60.

After the rotation of the radiator fan 74 is started, the control device 54 changes the rotational speed of the radiator fan 74 according to the water temperature. In this way, it is possible to suitably lower the temperature of the antifreeze and to effectively restrict the increase in the water temperature of the water circulation circuit section 26 by performing heat exchange with the antifreeze.

The water temperature detector 56 is provided at a position near the downstream side of the water electrolysis device 12. In this way, it is possible to directly detect the rise of the water temperature caused by the water electrolysis by the water electrolysis device 12, and the water electrolysis system 10 can perform operational control that reflects the water temperature change in real time.

In the standby mode, in which the exhaust heat of the water electrolysis device 12 is lower than during electrolysis, the control device 54 sets the water circulation pump 32 and the antifreeze circulation pump 72 to the operationally stopped state. In this way, the water electrolysis system 10 restricts the energy consumption. Further, the circulation of antifreeze is stopped, and therefore it is possible to restrict the temperature drop of the water of the water circulation circuit section 26 and to prevent freezing of the water.

The present invention is not limited to the embodiments described above, and various alterations may be made without deviating from the scope of the present invention.

What is claimed is:

1. A method of operating a water electrolysis system, wherein the water electrolysis system includes:
   a water electrolysis device;
   a water circulation circuit section including a water circulation pump and configured to circulate water to and from the water electrolysis device;
   an antifreeze circulation circuit section including an antifreeze circulation pump and configured to circulate antifreeze to and from a radiator;
   a heat exchanger configured to perform heat exchange between the water circulation circuit section and the antifreeze circulation circuit section; and
   a control device configured to control operations of the water circulation pump and the antifreeze circulation pump, the method comprising:
   before water electrolysis is started by the water electrolysis device, by the control device, circulating the water by driving the water circulation pump, and setting the antifreeze circulation pump to an operationally stopped state, wherein
   the control device sets the water circulation pump and the antifreeze circulation pump to an operationally stopped state, when in a standby mode in which exhaust heat of the water electrolysis device is lower than during water electrolysis.

2. The method of operating the water electrolysis system according to claim 1, wherein
   the water electrolysis device and the water circulation circuit section are housed inside a housing, and
   in the antifreeze circulation circuit section, at least the radiator is arranged outside the housing.

3. The method of operating the water electrolysis system according to claim 2, wherein
   a heater is provided in the housing, and
   when chamber temperature inside the housing is low, the control device performs heating with the heater.

4. The method of operating the water electrolysis system according to claim 1, wherein
   the water electrolysis system further includes a water temperature detector configured to detect a water temperature of the water circulation circuit section, and
   after the water electrolysis by the water electrolysis device is started, the control device keeps the antifreeze circulation pump in an operationally stopped state until the water temperature detected by the water temperature detector becomes greater than or equal to a pump operation start threshold value.

5. The method of operating the water electrolysis system according to claim 4, wherein
   when the water temperature is greater than or equal to the pump operation start threshold value, the control device controls the operation of the antifreeze circulation pump to change a circulation rate of the antifreeze according to the water temperature.

6. The method of operating the water electrolysis system according to claim 5, wherein
   when the water temperature becomes lower than a pump operation stop threshold value that is lower than the pump operation start threshold value, after becoming greater than or equal to the pump operation start threshold value, the control device stops rotation of the antifreeze circulation pump.

7. The method of operating the water electrolysis system according to claim 4, wherein
   the radiator includes a radiator fan configured to cool the antifreeze, and
   the control device starts rotation of the radiator fan when the water temperature becomes greater than or equal to a fan operation start threshold value that is higher than the pump operation start threshold value.

8. The method of operating the water electrolysis system according to claim 7, wherein
   the control device changes a rotational speed of the radiator fan according to the water temperature, after the rotation of the radiator fan has started.

9. The method of operating the water electrolysis system according to claim 4, wherein
   the water temperature detector is provided to a water discharge pipe forming a part of the water circulation circuit section for discharging water from the water electrolysis device.

* * * * *